(12) United States Patent
Cho et al.

(10) Patent No.: US 7,949,262 B2
(45) Date of Patent: May 24, 2011

(54) SPACE DIVERSITY RECEIVER FOR OPTICAL COMMUNICATIONS

(75) Inventors: Pak Shing Cho, Gaithersburg, MD (US);
Jacob Khurgin, Baltimore, MD (US);
Isaac Shpantzer, Bethesda, MD (US)

(73) Assignee: CeLight, Inc., Silver Spring, MD (US)

( * ) Notice: Subject to any disclaimer, the term of this patent is extended or adjusted under 35 U.S.C. 154(b) by 145 days.

(21) Appl. No.: 12/392,559

(22) Filed: Feb. 25, 2009

(65) Prior Publication Data

US 2009/0269083 A1    Oct. 29, 2009

Related U.S. Application Data

(63) Continuation-in-part of application No. 12/389,803, filed on Feb. 20, 2009, and a continuation-in-part of application No. 11/695,920, filed on Apr. 3, 2007, now Pat. No. 7,715,720, and a continuation-in-part of application No. 12/137,352, filed on Jun. 11, 2008, and a continuation-in-part of application No. 12/331,164, filed on Dec. 9, 2008, which is a continuation-in-part of application No. 10/669,130, filed on Sep. 22, 2003, now Pat. No. 7,327,913, and a continuation-in-part of application No. 11/610,964, filed on Dec. 14, 2006, now Pat. No. 7,397,979, and a continuation-in-part of application No. 11/672,372, filed on Feb. 7, 2007, now Pat. No. 7,483,600.

(60) Provisional application No. 61/090,404, filed on Aug. 20, 2008.

(51) Int. Cl.
*G02B 6/26* (2006.01)
*H04B 10/06* (2006.01)

(52) U.S. Cl. ........... 398/212; 385/15; 398/209; 398/214
(58) Field of Classification Search .......... 398/206–210, 398/212–214
See application file for complete search history.

(56) References Cited

U.S. PATENT DOCUMENTS

| | | | | |
|---|---|---|---|---|
| 5,245,681 A * | 9/1993 | Guignard et al. | ............... | 385/16 |
| 5,323,258 A * | 6/1994 | Tsushima et al. | ............. | 398/203 |
| 5,691,832 A * | 11/1997 | Liedenbaum et al. | .......... | 398/43 |
| 5,946,130 A * | 8/1999 | Rice | .............................. | 359/349 |
| 6,882,781 B2 * | 4/2005 | Ionov | .............................. | 385/48 |
| 7,657,190 B2 * | 2/2010 | Akiyama | ........................ | 398/195 |
| 2003/0090765 A1 * | 5/2003 | Neff et al. | ...................... | 359/172 |
| 2003/0138182 A1 * | 7/2003 | Dultz et al. | ...................... | 385/11 |
| 2007/0047954 A1 * | 3/2007 | Mamyshev | ...................... | 398/33 |
| 2009/0034967 A1 * | 2/2009 | Tao et al. | ......................... | 398/33 |
| 2009/0141333 A1 * | 6/2009 | Tsunoda et al. | ............... | 359/279 |
| 2009/0279902 A1 * | 11/2009 | Granot et al. | ................. | 398/208 |

* cited by examiner

*Primary Examiner* — Uyen-Chau N Le
*Assistant Examiner* — Chris H Chu
(74) *Attorney, Agent, or Firm* — Nadya Reingand (57) ABSTRACT

An optical beam combiner is provided, which allows efficient collection of light for various applications: non-line of sight and free-space optical communications, remote sensing, optical imaging and others. A multitude of transverse scattered optical beam portions is captured by the multi-aperture array positioned perpendicular to the beam projection direction. These beam portions are combined first into a single optical waveguide with modulating the beam portions phase and coupling ratio of directional couplers in the optical beam combiner tuned to maximize the final output power. A portion of the output beam is used for the power detection and forming a feedback signal for the phases and coupling ratios adjustment. The data is recovered from the received optical beam using coherent detection.

16 Claims, 6 Drawing Sheets

Fig. 1

Side View (b)

SPACE DIVERSITY RECEIVER FOR OPTICAL COMMUNICATIONS

CROSS-REFERENCE TO RELATED APPLICATIONS

This application claims priority of provisional Application Ser. No. 61/090,404 filed Aug. 20, 2008. It is also a continuation-in-part of U.S. patent applications: Ser. No. 12/389,803 filed Feb. 20, 2009; Ser. No. 11/695,920 filed Apr. 3, 2007 now U.S. Pat. No. 7,715,720; Ser. No. 12/137,352 filed Jun. 11, 2008, Ser. No. 12/331,164 filed Dec. 9, 2008, which are continuation-in-part applications of U.S. Ser. No. 10/669,130 filed Sep. 22, 2003 now U.S. Pat. No. 7,327,913, Ser. No. 11/610,964 filed Dec. 14, 2006 now U.S. Pat. No. 7,397,979, Ser. No. 11/672,372 filed Feb. 7, 2007 now U.S. Pat. No. 7,483,600, all of which applications are fully incorporated herein by reference.

FIELD OF THE INVENTION

This invention relates generally to laser systems and methods of receiving at least a portion of the laser beam after its transmission through scattering media. The system includes an optical beam combiner for receiving at least portions of the scattered beam, combining them together and recovering data encoded in the beam. The applications comprise non-line of sight optical communications (NLOS), free space optical communications, remote sensing, optical imaging and others.

BACKGROUND OF THE INVENTION

In this invention we disclose an optical signal receiver with improved light collection means in view of non-line-of-sight communication systems; however this approach is applicable for a variety of other arrangements: laser radars, remote sensing equipment, satellite communications, line-of-sight free space communication systems and others.

Secure laser communications through the atmosphere with non-line-of-sight (NLOS) reception capabilities are of great interests for commercial links and for military applications. Optical scattering in the atmosphere (Rayleigh and Mie) by gas molecules and aerosols provides the fundamental mean that enables NLOS communications. Reception of the laser signal, however, is challenging because of the small number of scattered photons that make their ways to the receiver and also a substantial solar background radiation that mask the signal light. Space-diversity via multiple aperture reception is an effective technique to mitigate the photon-starved transmission. Conventional space-diversity receiver combines multitude of electronic signals from multiple photoreceivers positioned along the projection of the transmission path of the optical beam. Each photoreceiver add its own thermal and dark current noise to the signal independently such that the overall noise grows as the number of photoreceiver. Furthermore, the complexity of the electronics and power dissipation increases as well.

There is a need for an efficient solution for the low intensity optical beam receiving in systems with laser beam propagation through the atmosphere.

SUMMARY OF THE INVENTION

Accordingly, an object of the present invention is to provide an optical device that compensates for phase and power non-uniformity across the optical beam caused by atmospheric turbulence and scattering. An optical device has $2^M$ input waveguides (M is an integer $\geq 1$), each receiving a portion of the incoming optical beam. The waveguides are connected by $(2^M-1)$ directional couplers forming a tree-like structure; each coupler is formed by two waveguides, coming in and out of the coupler. In each coupler one output waveguide forms an input waveguide of a subsequent coupler from $(2^M-1)$ couplers. A final output waveguide from the last coupler guides a final output beam of the device. A portion of the final output beam is tapped and used in control means changing input phases in at least one input waveguide of each coupler and changing coupling ratios of the couplers to maximize the final output beam power. The input phase is changed in a phase shifter connected to the same waveguide before coupling. The control means include a digital signal processing unit. In the preferred embodiment the couplers are two-section couplers with alternating or reversed $\Delta\beta$, wherein $\Delta\beta$ is a mismatch of propagation constants of the two coupling waveguides forming the directional coupler.

The output signal from the device can be detected and used for further processing, information recovery and display. The device may also include an optical receiver to detect the output beam. In the preferred embodiment this signal is received by a coherent optical receiver. In the coherent receiver it is combined with a local oscillator beam. In one embodiment the receiving beam and the local oscillator beam interfere in a 90-degrees optical hybrid and the output signals are processed by a set of balanced photodetectors.

Another object of the present invention is to provide an integrated single monolithic adjustable electro-optic device to perform this operation. However the description is provided of any kind of device: integrated device, a free-space optical link device, and a fiber optics device.

Yet another object of the present invention is to provide a system and method for information recovery, which can find applications in non-line-of-sight optical communications. The receiving unit includes an optical beam combiner with a set of input waveguides, each receiving a portion of incoming optical beam. $2^M$ inputs of the combiner interfere with each other via a system of tunable coupled waveguides connected by directional couplers with adjustable coupling ratios. The phases and the coupling ratios in the interleaved waveguides of the combiner are adjusted to maximize the resulting output signal. The combiner may be used for coherent communication in combination with a balanced 90° hybrid. The receiving unit may be located as far as 2000 meters from the transmitter. The transmitter may include a light source that generates multiple wavelengths in the UV, visible or infrared ranges. In one embodiment the system operates at wavelengths of Fraunhofer lines of the solar spectrum, and in another embodiment the wavelengths of the transmitting beam are selected within the solar blind region, for example, from 230 nm to 290 nm. In the preferred embodiment the data is embedded using orthogonal frequency division multiplexing (OFDM) with QPSK data encoding. The multitude of OFDM-QPSK signals are multiplexed using wavelength division multiplexing (WDM) prior to sending the information bearing beam.

In some embodiments the system may include more than one optical beam combiner. The information bearing signal may be detected by a set of receivers, each having a beam combiner with an array of waveguides.

BRIEF DESCRIPTION OF THE DRAWINGS

FIG. 1 (*a*) schematic of a NLOS link with transverse position of the detector arrays; (*b*) a NLOS link with a two-dimensional 8×8 array receiver for reception of scattered light from the main laser beam; (c) schematics illustrates two possible scattered beam collected by a single elements; only two sets of scattered beams are shown for clarity FIG. 2 Top view of a schematic of a NLOS link with a two-dimensional 8×8 array receiver for reception of scattered light from the main laser beam.

DETAILED DESCRIPTION OF THE PREFERRED EMBODIMENT

The present invention now will be described more fully hereinafter with reference to the accompanying drawings, in which the preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

NLOS communications requires very sensitive receiving system, because of the small number of scattered photons that make their ways to the receiver and also a substantial solar background radiation that mask the signal light. Space-diversity via multiple aperture reception is an effective technique to mitigate the photon-starved transmission. An all-optical approach is disclosed here wherein multitude of transverse scattered optical beams captured by the multi-aperture array are combined first into a single optical waveguide with minimal loss of power before coherent detection. This is possible utilizing the fact that the transverse scattered beam path length difference is much smaller than longitudinal scattered path length difference at the receiver array. This arrangement concerns a space-diversity optical receiver utilizing such optical beam combining for NLOS laser communications.

Figure 1:
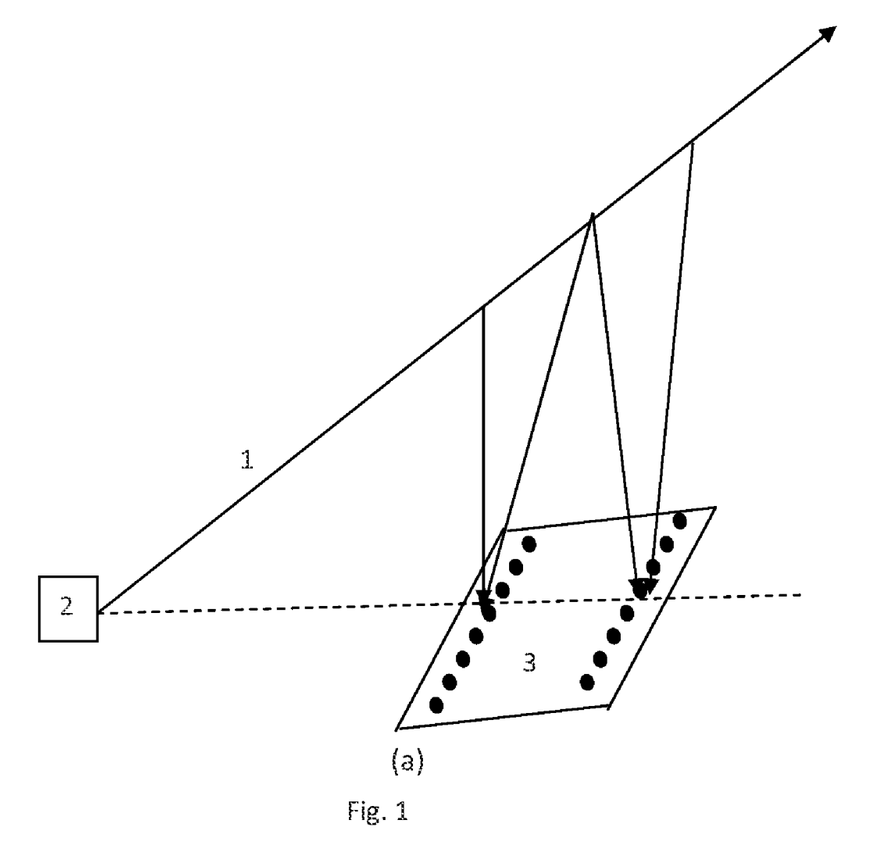

FIG. 1(a) depicts a schematic of a NLOS link with the proposed receiver. Information-bearing laser beam 1 from a transmitter 2 propagates through the atmosphere at an elevated angle. In the preferred embodiment rows of a receiver 3 points in a direction normal to the projection of the beam propagation. The receiver collects portions of scattered light from a range of directions determined by the field-of-view (FOV) of the receiver. The proposed space-diversity receiver 3 includes a two-dimensional array of micro-optics that collects and focuses light into an array of single-mode optical waveguides such as optical fibers, not shown in the FIGURE but will be described later. Examples of the micro-optics array include but not limited to fiber collimator arrays available from MEMS Optical, Inc., Huntsville, Ala. or microlens arrays fabricated by Heptagon USA, Inc., San Jose, Calif. An example of an 8×8 array is depicted in FIG. 1 (b), however any number of microlenses in the array is possible. The micro-optics elements are arranged in the longitudinal (y) and transverse (x) directions relative to the direction of the beam projected horizontally as shown in FIG. 1 (b).

For the purpose of illustration, we consider a single row of the array in the transverse direction (x), for example, row #5 with elements 1 to 8 enclosed in the dashed line shown. The receiver element $R_{51}$ collects scattered beams A and B within its FOV limit. As shown in FIG. 1(c), the scattered beam A might arrive at the element $R_{51}$, via path $\alpha\beta$ while scattered beam B might arrive at the element $R_{51}$ via path $\alpha\gamma\beta$. Note that there are many other possible scattered beams that can be collected by element $R_{51}$ between points $\alpha$ and $\gamma$. The length difference between these two paths will be substantially larger than the symbol length (e.g., 3 m) of the transmitted data for applicable transmitter-receiver distance (e.g., 1 km). The path length is determined by the FOV of the element, transmitter-receiver distance, and elevation of the main laser beam among other parameters. An arrival time delay $\tau_{51}$ between the two scattered beams from the point $\alpha$ related to the path length difference can be identified which can be substantially larger than the symbol period (e.g. 10 ns). A similar time delay $\tau_{58}$ can be defined for the receiver element $R_{58}$ collecting scattered beams C and D, for example.

Figure 2:
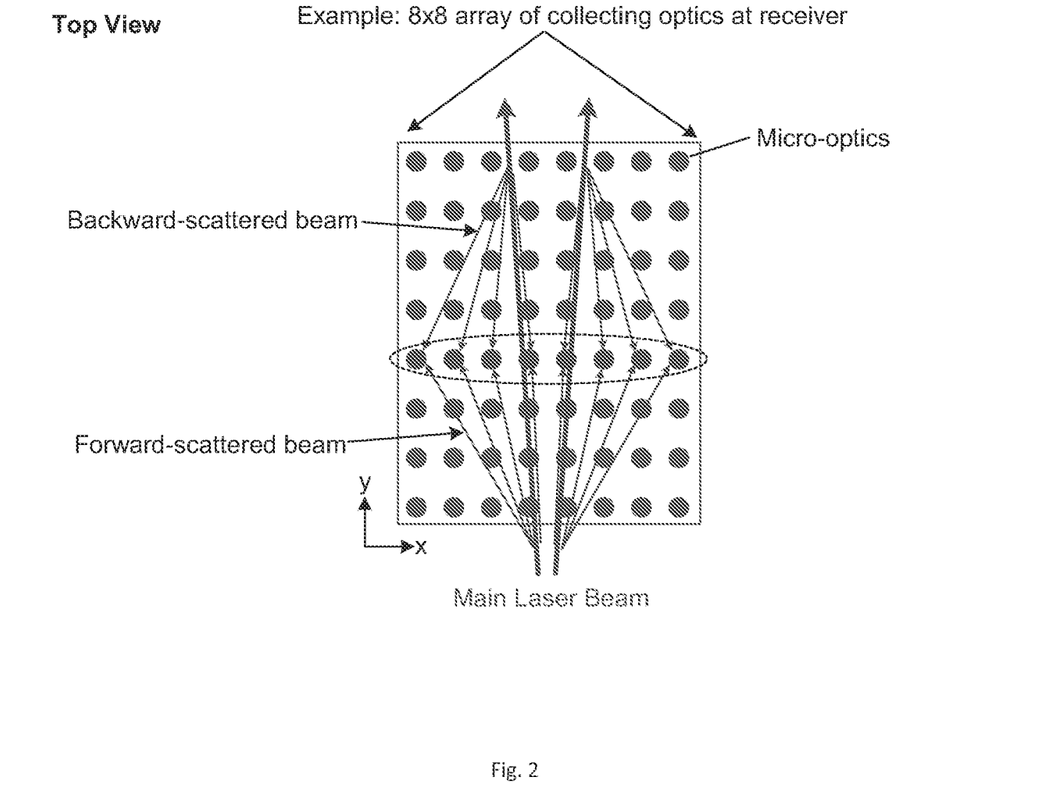

Even though both $\tau_{51}$, and $\tau_{58}$ can be large the absolute difference between them, however, is relatively small. In fact, the following relations is expected $$\frac{|\tau_{ij} - \tau_{ik}|}{\tau_{im}} \ll 1, j \neq k,$$

where i denotes the row number in the longitudinal (y) direction while j, k, and m are the column indices in the transverse (x) direction. This can be readily seen in FIG. 2 depicting the top view of the NLOS link and the receiver. Because of the limited size of the receiver aperture, the path length difference between adjacent elements in the transverse (x) direction is much smaller than a symbol length. Take, for example, a 100MSymbol per second signal where the symbol length is 3 m (10 ns). To produce a maximum delay of 10 ns between two furthest apart elements in the same row would require the receiver to be almost 3 m wide. Typical receiver array dimension is expected to be in the range of 10 cm or less (~0.3 ns delay) which is negligible compared with the symbol period.

Figure 3:
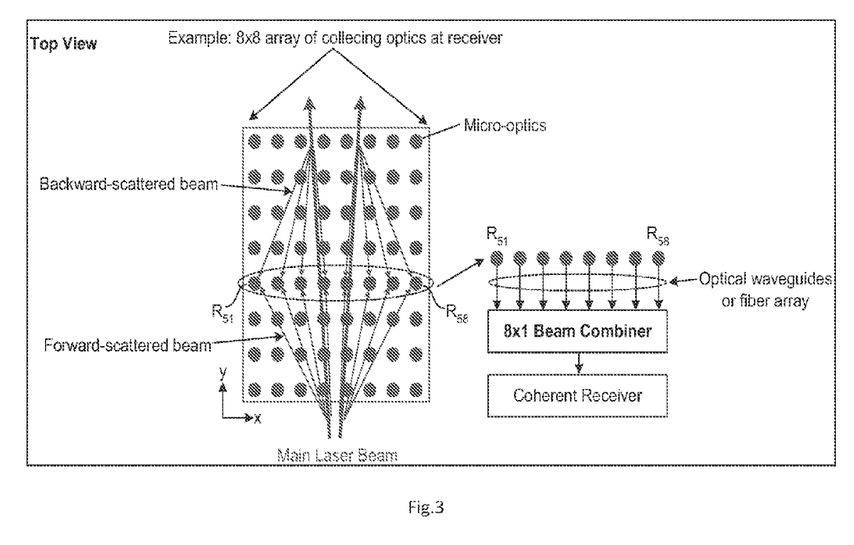
FIG. 3. Top view of a schematic of a two-dimensional 8×8 array receiver for reception of scattered light from the main laser beam, showing how the optical beams from the row of micro-optics R51-R58 are combined together and inserted in a coherent receiver.
Figure 4:
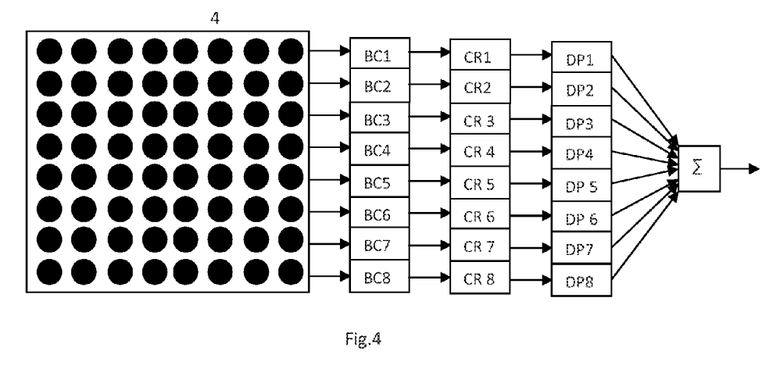
FIG. 4 Example of an 8×8 receiver array with beam combiner for each row connected to a coherence receiver followed by DSP producing an output signal after summation.

Because of this property one can optically combine the light power collected by all the elements in the same row or in the transverse direction without temporal compensation or alignment of the optical symbol in the collected scattered beams from each element in the row before detection. For each row of the receiver aperture array, a beam combiner is used to optically sum the light power collected from each elements in that row. The optical sum is possible because the scattered beam path difference in the transverse direction is significantly smaller than a symbol length (10 ns). As shown in FIG. 3, an 8×1 optical beam combiner with eight inputs connected to eight elements in the same row of the receiver array optically sum the light power before coherent detection. FIG. 4 shows schematic of the architecture of the overall receiver 3 for an 8×8 receiver array 4. A set of beam combiners (BC1-BC8) followed by a set of coherent receivers (CR1-CR8) are connected to the array. Signal from each of the eight coherent receiver outputs are digitally processed via a DSP unit (one unit from the set of DP1-DP8) to realign the symbols in time before summation $\Sigma$. Recovered data can be obtained after applying data-recovery DSP to the summed signal. A schematic of a $2^M \times 1$ or generalized M-stage optical beam combiner was previously described in the U.S. patent application Ser. No. 12/389,803 filed Feb. 20, 2009 by the same inventive entity, which is fully incorporated herein by reference.

In the preferred embodiment the generalized M-stage beam combiner includes $2^M$ inputs, where M is an integer. The combiner shown in FIG. 5 has 4 inputs as an example. In the preferred embodiment the interface optical unit includes focusing lenses R1-R4 and a bundle of optical fibers. In one embodiment, the focusing optics can be cylindrical.

All optical beams entering the combiner 10 have different powers. The combiner has three directional couplers 11-13 with two output branches each, where one output branch (14,15 in FIG. 5) of each coupler serves as an input waveguide for a sequential coupler. There is at least one phase shifter in at least one input waveguide for each coupler, see phase shifters 14-16 in FIG. 5. A portion of the final beam from final waveguide 17 is tapped in 18. The operation of each stage is the following. The power $P_m$ detected by the detector 19 is maximized by applying a set of correction signals 20 to the phase shifters and couplers sequentially. The phase of the signal in the input waveguide is changed until a constructive interference occurs in the one output branch and a destructive in the other branch of the coupler. The branches with constructive interference (21 and 22 in FIG. 5) serve as input waveguides for the sequential coupler 13. This procedure is disclosed in more details in U.S. patent application Ser. No. 12/389,803 by the same inventors.

It is easy to generalize this approach to the larger number of input waveguides: 8, 16, 32 . . . . In all schematics, the waveguides will form tree-like structure with directional couplers connecting adjacent waveguides.

Figure 5:
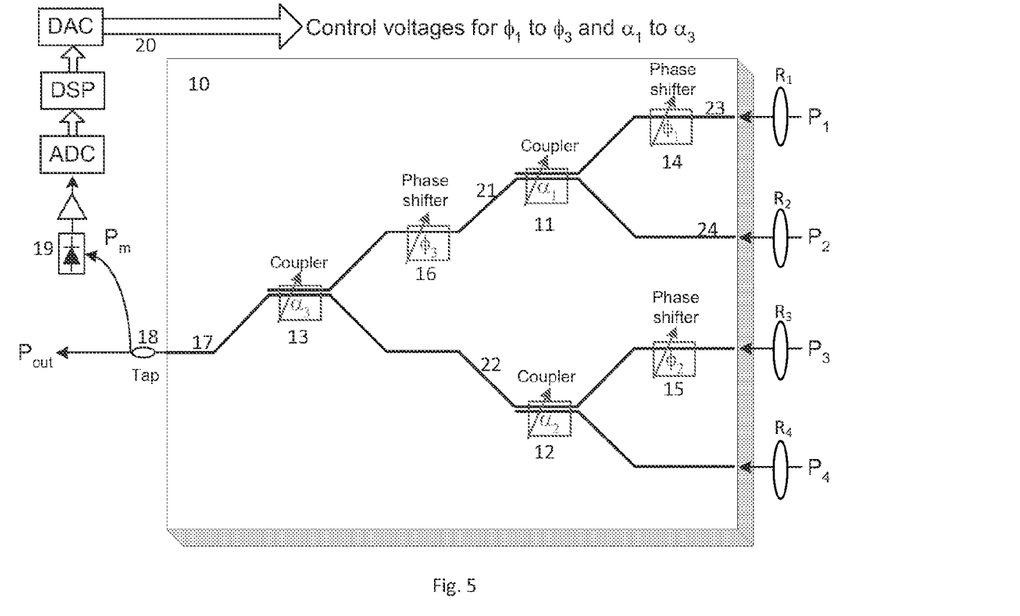
FIG. 5 A 4×1 optical beam combiner with a feedback control loop for maximizing the combined output power via adjustment of the phase shifters and couplers.

It is beneficial to have phase shifters in both the upper and lower coupled waveguides, for example, both in waveguides 23 and 24, etc. In this case a push-pull operation with an equal but opposite sign phase shifts in the upper and lower waveguides can be used. However, in principle, the same phase shift can be achieved by implementing only one phase-shifter in one of the two branches as shown in FIG. 5.

The correction signals also serve to adjust the coupling ratios of all couplers. By adaptively adjusting the phase shifters and the coupling ratios of the coupler an improved power combining efficiency (defined below) is obtained compared with the phase-only fixed 50/50 coupling combiner where the coupling ratios of all the couplers are fixed at 50/50. Modeling result shows that adjustment of both the phases and coupling ratios of the combiner couplers allows achieving 100% power combining efficiency regardless of the number of inputs and the distribution of the input powers. This is in sharp contrast to the phase-only fixed 50/50 coupling combiner where the power combining efficiency is always less than 100% and it is dependent on the number of inputs and the distribution of the input powers. A 100% power combining efficiency of the phase-only fixed 50/50 coupling combiner can be achieved if and only if all the input powers are exactly equal.

In the general case, the combiner has M stages with $N=2^M$ input optical powers ($P_1, P_2, \ldots P_N$) and a single optical output ($P_{out}$) The combiner has N−1 directional couplers ($\alpha_1, \alpha_2, \ldots, \alpha_{N-1}$) and phase-shifters ($\phi_1, \phi_2, \ldots, \phi_{N-1}$) interconnected by single-mode optical waveguides in a tree structure. In order to combine efficiently all the input optical beams into a single output beam, the phase of the individual optical beam and coupling ratios of the couplers must be adjusted properly in order to provide constructive interference at the desired output port of the directional coupler with minimal loss of power. The beam combiner performance is quantified by the power-combining efficiency which is defined as the ratio of the combined output power to the sum of the input powers as follows $$\eta = \frac{P_{out}}{P_1 + P_2 + \ldots + P_N} = \frac{P_{out}}{\sum_{i=1}^{N} P_i} = \frac{P_{out}}{P_{max}} \le 1.$$

The maximum power-combining efficiency is one for an ideal lossless combiner with optimal coupling ratio and phase as it was shown in U.S. patent application Ser. No. 12/389,803 by the same inventive entity.

Simulation results show that implementation of the beam combiner using the two-section coupler with alternating or reversed $\Delta\beta$ is desirable as a result of its robustness, wherein $\Delta\beta$ is a mismatch of propagation constants of the two coupling waveguides forming the directional coupler.

Examples of material platform for the integrated beam combiner are: lithium niobate, III-V semiconductors such as InP, InGaAs, GaAs for IR wavelength. For UV/violet applications, semiconductor passive waveguide with low absorption in the 400-nm range can be utilized such as SiC, GaN, and AlxGa1-xN alloys.

The integrated beam combiner consists of many directional couplers and phase shifters interconnected with waveguides. Because of this curved waveguides are necessary for interconnections. Conventional dielectric curved waveguides suffer significant attenuation due to scattering and radiation losses if the radius of curvature of the curved waveguide is too small. Moderate to large bend radius is needed to keep the bend-induced optical losses to a minimum. In fact, the radius of curvature must well exceed the optical wavelength to avoid large losses at the bends. As a result, waveguide elements such as couplers and phase shifters of the beam combiner can be separated quite far apart. This significantly increases the device size especially with large-scale integration. Moreover, large waveguide bend radius requires longer waveguide length to accommodate the gradual bend which increases optical loss due to intrinsic material absorption. Optical loss of the beam combiner decreases the power-combining efficiency and therefore reduces its performance and effectiveness.

To overcome the bend-induced loss limitation, novel guided-wave approach for the beam combiner is provided. One approach is based on nanophotonics: 2-D photonic-crystal waveguides (PCW) with linear defects and photonic wires in a photonics band-gap material such as those described in R. D. Meade et al., "Novel applications of photonic band gap materials: low-loss bends and high Q cavities," *J. Appl. Phys.*, vol. 75, p. 4753, 1994, and in the U.S. Pat. No. 5,682,401 by J. Joannopoulos et al. It has been shown that this type of photonic band-gap structure can tolerate very tight bends with minimal or zero losses, see, for example, A. Mekis et al., "High transmission through sharp bends in photonics crystal waveguides," *Phys. Rev. Letts.*, vol. 77, p. 3787, 1996. In fact, it has been shown theoretically that curved PCWs can achieve complete transmission (lossless) at certain optical frequencies, and very high transmission (>95%) over wide frequency ranges. Moreover, low optical loss can be achieved even for 90° bends with zero radius of curvature, with a maximum transmission of 98% as opposed to 30% at most for analogous conventional dielectric waveguides. Therefore, bend-induced optical losses can be significantly reduced (from −5.2 to −0.088 dB, for example) with the PCWs. As a result, more couplers and phase shifters can be densely packed on a single substrate reducing the overall size of the beam combiner. The nanophotonic waveguides can be fabricated, for example, on silicon-on-insulator with standard CMOS technology as described in W. Bogaerts et al., "Nanophotonic waveguides in silicon-on-insulator fabricated with CMOS technology," J. Lightwave Technol., vol. 23, p. 401, 2005.

Figure 6:
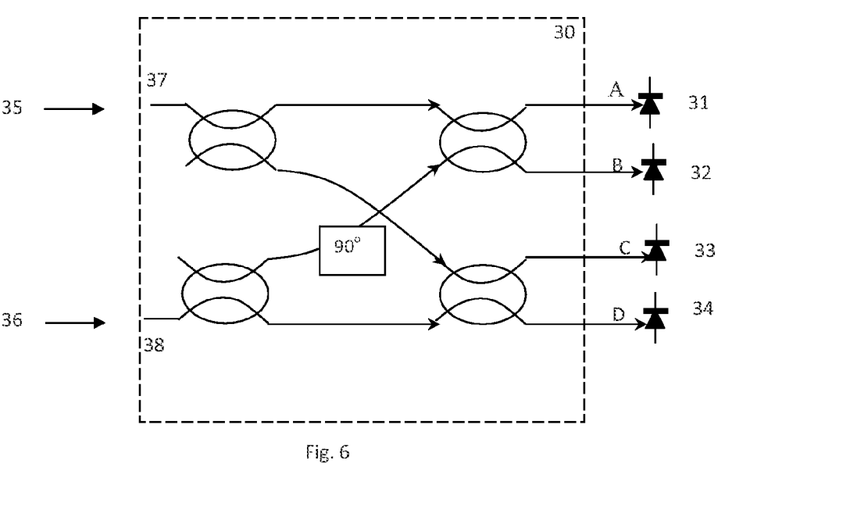
FIG. 6 A schematic of a coherent receiver of the present invention based on 90-degrees optical hybrid.

In the preferred embodiment the beam combiner is part of a coherent optical receiver with a 90-degrees optical hybrid as shown in FIG. 6. A 90-degrees optical hybrid is described in U.S. patent application Pub. Ser. No. 11/695,920 filed by the same team of inventors.

The schematic diagram of the coherent detector is shown in FIG. 6. In one embodiment, it consists of a 90-degrees optical hybrid 30 and four balanced photodetectors 31-34. Two incoming optical signals 35 and 36, called, respectively, the signal S and the local oscillator L, impinge two inputs 37 and 38 of the optical hybrid. Both signal beam S and local oscillator L beam are divided by the first set of 3 dB couplers and mixed together with an additional phase shift of 90 degrees. The resulting four output signals A, B, C, D, all have 90 degrees relative phase difference of the form: A=S+L, B=S−L, C=S+jL and D=S−jL.

Figure 7:
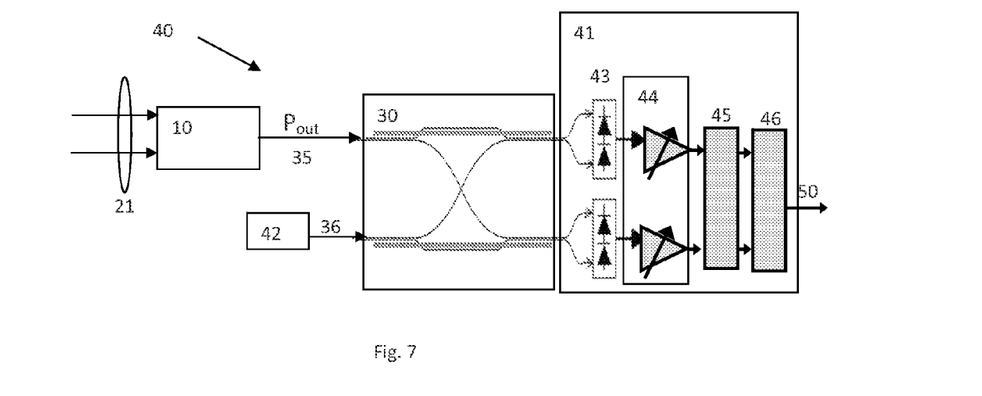
FIG. 7 A schematic of a coherent receiver of the present invention based on 90-degrees optical hybrid with the optical combiner and local oscillator inputs.

An optical receiver 40 of FIG. 7 consists of three main blocks: the beam combiner 10, an optical 90-degrees hybrid 30 and a detector unit 41. It serves for the signal receiving and coherent detection. The beam combiner 10 provides a maximum optical power $P_{out}$ into the output 35 as described above. The output signal $P_{out}$ is mixed with a local oscillator signal 36 from a local oscillator light source 42 in a 90-degrees optical hybrid 30 followed by a set of detectors 43. In the preferred embodiment balanced detectors are used. After the signal amplification in the transimpedance amplifiers 44, they are converted into digital signals in the A/D converter 45 followed by a digital signal processing unit (DSP) 46. The output signal 50 can be used for further processing, for the data recovery and display.

The output signal 50 serves for the further processing, for example, for recovery of the information encoded in the beam detection as described in U.S. patent application Ser. No. 12/331,164 filed Aug. 20, 2008, owned by the same company as the present invention, which is fully incorporated herein by reference. A 90-degrees optical hybrid is described in details in U.S. patent application Pub. Ser. No. 10/695,926 filed Apr. 3, 2007 and owned by the same company as the present invention, which is fully incorporated herein by reference.

The coherent detector performs homodyne or self homodyne detection of the received signal.

In one embodiment the light source generates a pulsed optical signal.

In the preferred embodiment the data is transmitted using Orthogonal Frequency Division Multiplexed (OFDM) communications as disclosed by the same team of inventors in U.S. patent application Ser. No. 12/137,352 filed Jun. 11, 2008. In each channel the optical carrier is directly modulated by a complex RF signal that can be construed as a linear combination of M separate digitally modulated RF signals at frequencies $f_m$ such that $f_m=m/T$ where m is an integer from 1 to M and T is the period of modulation. Thus the total data rate of the transmitted information is M/T. The primary advantage of OFDM over single-carrier schemes is its ability to cope with severe channel conditions—for example, frequency-selective fading due to multipath without complex equalization filters. Channel equalization is simplified because OFDM may be viewed as using many slowly-modulated narrowband signals rather than one rapidly-modulated wideband signal. Low symbol rate makes the use of a guard interval between symbols affordable, making it possible to handle time-spreading and eliminate inter-symbol interference (ISI). This is achieved via cyclic prefix in the guard interval to maintain orthogonality of the subcarriers. In the preferred embodiment data QPSK (quadrature phase shift keying) format is embedded in the OFDM system.

In the preferred embodiment the multitude of OFDM channels are combined together using wavelength division multiplexing (WDM).

Figure 8:
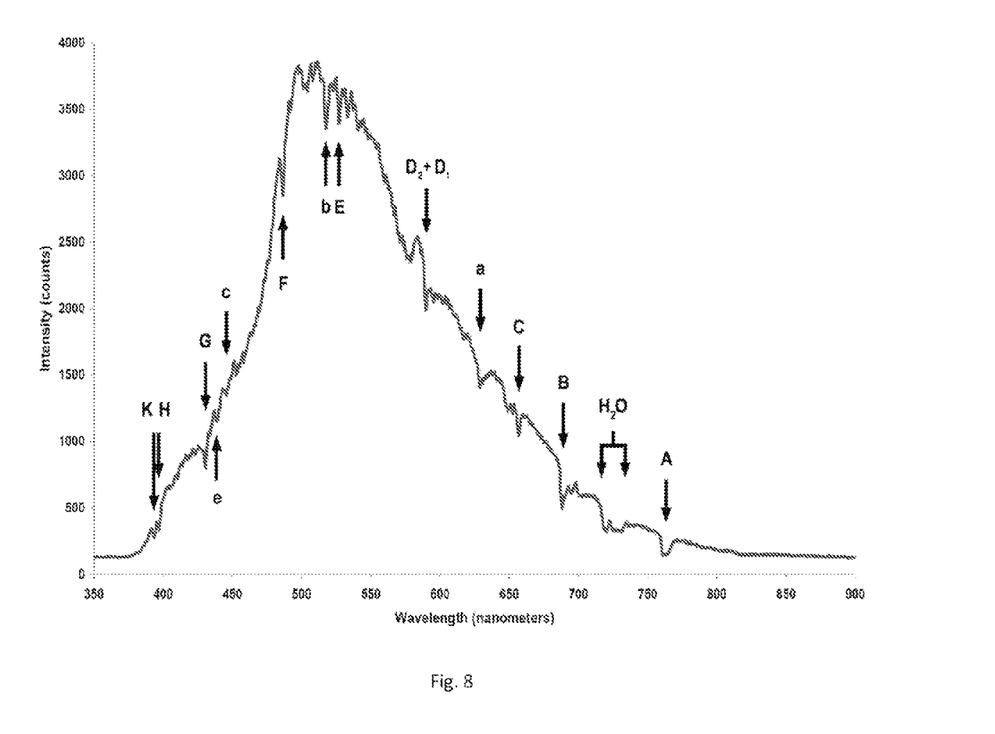
FIG. 8 Fraunhofer lines in the solar spectrum.

The disclosed communication system may operate in visible, infrared or ultraviolet spectral range. In one embodiment the light of solar blind region (200-290 nm or another) is chosen to eliminate the influence of solar radiation. In another embodiment the Fraunhofer lines of solar spectrum are used for the same goal (shown in FIG. 8)

Main advantages of the proposed technique using beam combiner to sum the transverse scattered beam are: (1) reduced number of high-speed photodetectors and electronics, (2) all the opto-electronics such as photodetectors, amplifiers, A/D converters do not have to be co-located with the receiver aperture array optics. Smaller number of high-speed photodetectors and electronics reduces the amount thermal noise added to the signal improving the signal-to-noise ratio. Furthermore, power, size, and weight requirements are significantly reduced. Because of the flexibility using optical fiber array, the opto-electronics components can be placed far away the receiver aperture if desired. This is an important feature especially when there is a constraint in space where the receiver aperture is located (e.g., aircraft or submarine).

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optical device for an optical beam receiving, comprising:
    $2^M$ input waveguides, where M is an integer $\geq 1$, receiving different spatial portions of the optical beam propagating in free space; the waveguides forming an array positioned perpendicular to the optical beam propagation direction;
    ($2^M-1$) directional couplers; each coupler is formed by two waveguides, coming in and out of the coupler;
    a first output waveguide from each coupler forming an input waveguide for a subsequent optical coupler from ($2^M-1$) couplers;
    a final output waveguide from the last coupler forming a final output beam of the device;
    and wherein a portion of the final output beam is used in control means changing input phases in at least one input waveguide of each coupler to maximize the final output beam power, wherein the control means include a photodetector receiving the portion of the final output beam, producing an electrical signal being used to change the input phases in at least one input waveguide of each coupler, wherein the input phase is changed in a phase shifter connected to the same waveguide before coupling and wherein the electrical signal is used to change the coupling ratio of each coupler, wherein the coupling ratio change leads to maximization of the final output beam power receiving by the photodetector.

2. The device of claim 1, wherein the device is selected from at least one of, an integrated device, a free-space optical link device, and a fiber optics device.

3. The device of claim 1, wherein at least one coupler is a two-section coupler with an alternating or reversed $\Delta\beta$, wherein $\Delta\beta$ is the mismatch of the propagation constants of the two coupling waveguides that form the directional coupler.

4. The device of claim 1, further comprising: a coherent optical receiver with a 90-degrees optical hybrid to receive the output beam and mix it with a local oscillator beam; the coherent receiver allowing recovery of a photon starved signal.

5. A non-line of sight optical communication system, comprising:
    a transmitter sending an information bearing light beam through the atmosphere at an elevated angle;
    a receiving unit, receiving a light scattered on atmospheric inhomogeneities along the beam propagation and changed a direction of the propagation due to the scattering; the receiving unit including at least a first combiner for the receiving beam, comprising $2^M$ input waveguides, where M is an integer $\geq 1$, receiving different spatial portions of the optical beam; the waveguides forming an array positioned perpendicular to the optical beam propagation direction;
    ($2^M-1$) directional couplers; each coupler is formed by two waveguides, coming in and out of the coupler;
    a first output waveguide from each coupler forming an input waveguide for a subsequent optical coupler from ($2^M-1$) couplers; a final output waveguide from the last coupler forming
    a final output beam of the device; and wherein a portion of the final output beam is used in control means changing input phases in at least one input waveguide of each coupler to maximize the final output beam power, wherein the control means include a photodetector receiving the portion of the final output beam, producing an electrical signal being used to change the input phase of the optical beam in the same waveguide before its coupling, the input phase is changed in a phase shifter connected to the same waveguide before coupling and wherein the electrical signal is used to change the coupling ratio of each coupler to maximize the final output beam power received by the photodetector.

6. The system of claim 5, further comprising a second combiner, wherein $2^M$ input waveguides of the second combiner being positioned parallel to the $2^M$ input waveguides of the first combiner; the waveguides of the second combiner receiving second spatial portions of light scattered on atmospheric inhomogeneities; the second spatial portions of light being received from a second part of the information bearing beam; the second part does not overlap with a first part of the beam, from which the scattered light is collected by the first combiner.

7. The system of claim 5, wherein the receiving unit is positioned at least 1-2000 meters from the transmitter.

8. The system of claim 5, wherein the data is embedded using orthogonal frequency division multiplexed communication with QPSK data encoding.

9. The system of claim 5, wherein the light source generates a spectrum of wavelengths in the ultraviolet, optical or infrared ranges.

10. A method of non-line of sight data transmission, comprising: sending an information bearing light beam through the atmosphere at an elevated angle; receiving first portions of a light scattered on atmospheric inhomogeneities along the beam propagation by at least a first optical combiner, comprising $2^M$ input waveguides, where M is integer $\geq 1$; the input waveguides forming a one-dimensional array positioned perpendicular to the beam propagation direction; coupling each pair of adjacent waveguides; each coupler is formed by two waveguides, coming in and out of the coupler; in each coupler the output of a first output waveguide forming an input waveguide for a subsequent optical coupler from ($2^M-1$) couplers; an output waveguide from the last coupler forming a final output beam of the device; and wherein the control means changing the input phases to maximize the final output beam power; and wherein a portion of the final output beam is used in control means changing the coupling ratios to maximize the final output beam power.

11. The method of claim 10, further comprising: receiving second portions of light scattered on atmospheric inhomogeneities by a second combiner wherein $2^M$ input waveguides of the second combiner being positioned parallel to the $2^M$ input waveguides of the first combiner; the second portions of light being received from a second part of the information bearing beam; the second part does not overlap with a first part of the beam, from which the scattered light is collected by the first combiner.

12. The method of claim 10, further comprising: receiving the output beam by a coherent receiver, the receiver based on a 90-degrees optical hybrid.

13. The method of claim 10, further comprising: embedding the data in the light beam using orthogonal frequency division multiplexing (OFDM) with QPSK data encoding in each sub-carrier of the OFDM signal prior to sending the beam.

14. The method of claim 13, further comprising: multiplexing multitude of OFDM-QPSK signal using wavelength division multiplexing (WDM) prior to sending the beam.

15. The method of claim 14, wherein: the wavelengths of the sending beam are selected from Fraunhofer lines of the solar spectrum.

16. The method of claim 14, wherein: the wavelengths of the sending beam are selected from the solar blind region in the ultraviolet, optical or infrared ranges.

* * * * *